UNITED STATES PATENT OFFICE

FRITZ BAUMANN, OF LEVERKUSEN-ON-THE-RHINE, GERMANY, ASSIGNOR TO GENERAL ANILINE WORKS, INC., OF NEW YORK, N. Y., A CORPORATION OF DELAWARE

ANTHRAQUINONYL CARBAZOLES

No Drawing. Application filed March 8, 1929, Serial No. 345,608, and in Germany March 14, 1928.

The present invention relates to vat dyestuffs of the anthraquinone series, more particularly it relates to compounds of the probable general formula:

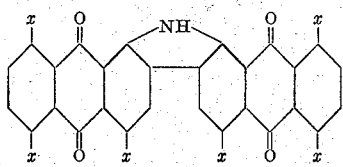

wherein at least one $x$ stands for an anthraquinonyl imino residue, being attached to the nucleus by only one linkage in position $x$ and the other $x$'s stand for hydrogen or a monovalent substituent and wherein all nuclei may be further substituted, for example, by halogen, a hydroxy-, alkyloxy- or a substituted amino-group, such as a benzoylamino group.

My new compounds are obtainable by reacting upon a 2.2'-di-anthraquinonyl-1.1'-carbazole which may be represented by the following formula:

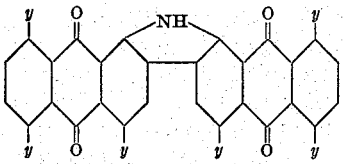

wherein at least one $y$ stands for a primary amino group and the other $y$'s stand for hydrogen or a monovalent substituent and wherein the nuclei may be further substituted, with a halogen-anthraquinone compound at an elevated temperature, say at about 180° C. to about 250° C. for a prolonged time, for instance, for 3–4 hours. Advantageously the reaction is carried out in a high-boiling organic solvent, such as naphthalene, trichlorobenzene, ethylcarbazole, and in the presence of an acid binding agent, for example, magnesia, sodium acetate, soda or potash, and if desired, in the presence of a suitable catalyst, such as copper or a salt thereof.

In view of the insolubility in organic solvents, the new dyestuffs separate during the reaction and can be easily isolated by filtering, if desired, after previously diluting the mixture with an organic solvent, such as pyridine, toluene, alcohol and the like. Inorganic substances, eventually present, in the dyestuff, can be removed by boiling with diluted nitric acid; organic impurities may be eliminated by boiling with nitrobenzene, quinoline and the like.

My new products generally are red to greyish-black colored powders, sometimes of a crystalline structure. They are insoluble or scarcely soluble in organic solvents, and soluble in concentrated sulfuric acid with a blue to reddish brown coloration. Cotton is dyed from the vat red to greyish black shades of excellent fastness properties.

The invention is illustrated by the following examples, without being limited thereto:

*Example 1.*—7 parts by weight of 5.5'-di-amino-2.2'-di-anthraquinonyl-1.1'-carbazole of the formula:

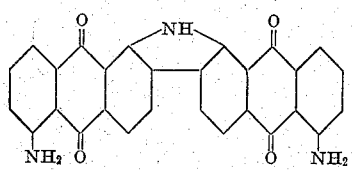

said compound being obtainable by saponification with sulfuric acid of the corresponding dibenzoyl-compound (compare German Patent 239,549), are heated to boiling while stirring with 14 parts by weight of 1-p-tolyl-azimido-3-bromo-anthraquinone, 12 parts by weight of water-free potassium acetate, 3 parts by weight of magnesia, and 0.3 parts by weight of copper and 200 parts by weight of naphthalene. The orange melt soon becomes red while separating at the same time dark-red crystals. When the quantity of the crystals no longer increases, the reaction is interrupted and the crystals are sucked at about 150° C. After washing with alcohol, diluted hydrochloric acid, a dark red crystalline powder is obtained having probably the following formula:

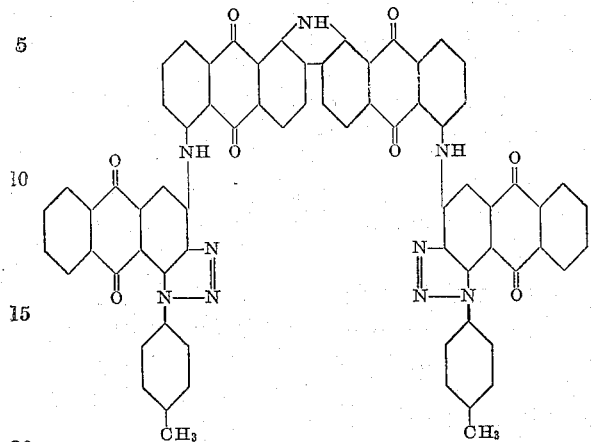

The new dyestuff is insoluble in organic solvents, soluble in concentrated sulfuric acid with a blue coloration. On pouring into water the sulfuric acid solution, the dyestuff is reprecipitated in form of red flakes. From the vat cotton is dyed powerful red shades of excellent fastness properties.

*Example 2.*—8 parts by weight of 4.4′-di-amino-2.2′-di-anthraquinonyl-1.1′-carbazole are heated to boiling in 160 parts by weight of nitrobenzene with 9 parts by weight of β-chloroanthraquinone, 4 parts by weight of calcined soda, 0.3 parts by weight of copper bronze. When the starting material can no longer be detected, the reaction is interrupted and the mixture is sucked at 140–150° C. The dyestuff having the probable formula:

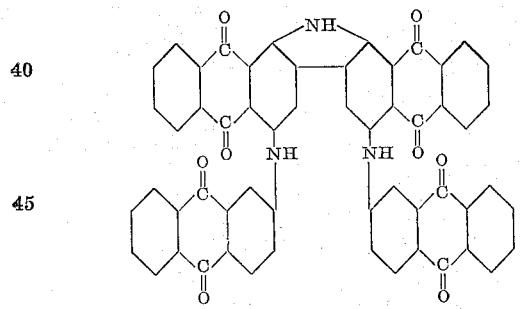

is washed with nitrobenzene, alcohol and water, and is thus obtained in form of a greyish blue colored powder which dissolves in sulfuric acid with an olive green coloration. It is scarcely soluble in organic solvents. From its yellowish-brown vat cotton is dyed corinth shades of excellent fastness properties.

*Example 3.*—5.6 parts by weight of 5-amino-4′-benzoyl-amino-2.2′-anthraquinonyl-1.1′-carbazole (obtainable by partial saponification at about 50° C. with sulfuric acid of 5-benzoyl-amino-4′-benzoyl-amino-2.2′-dianthraquinonyl-1.1′-carbazole) are heated in 120 parts by weight of naphthalene to a temperature of 210° C. with 4 parts by weight of 1-benzoyl-amino-4-chloro-anthraquinone, 3 parts of water-free potassium acetate, 2 parts by weight of magnesia and 0.3 parts by weight of copper powder, until the quantity of the separated dyestuff no longer increases. Then the hot naphthalene melt is diluted with 100 parts by weight of pyridine and sucked off at 100° C. The suction residue is washed with water, boiled with diluted nitric acid, filtered, washed until neutral and dried. The greyish-black powder thus obtained having probably the following formula:

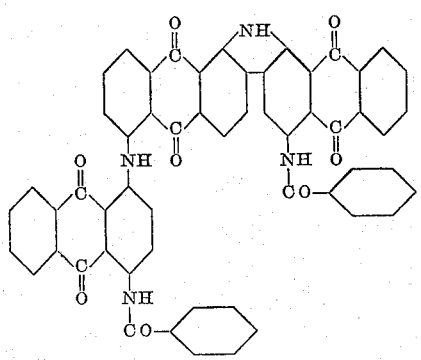

dissolves in sulfuric acid with a reddish-brown coloration. From the vat cotton is dyed blackish-brown shades.

I claim:

1. As new products vat dyestuffs of the following general formula:

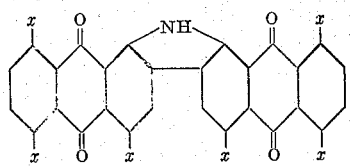

wherein at least one $x$ stands for an anthraquinonyl imino residue being attached to the nucleus by only one linkage in the position $x$, and the other $x$'s stand for substituents of the group consisting of hydrogen and any monovalent substituent and wherein all nuclei may be further substituted, being generally red to greyish colored powders, insoluble in organic solvents, soluble in concentrated sulfuric acid with a blue to reddish-brown coloration and dyeing cotton from the vat red to greyish-black shades of excellent fastness properties.

2. As new products vat dyestuffs of the following general formula:

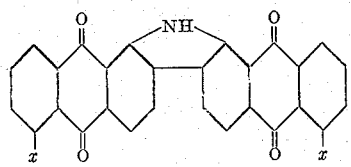

wherein the $x$'s stand for anthraquinonyl-imino groups, which may be substituted and which are attached to the nuclei by only one linkage in the position $x$, being generally red to greyish colored powders, insoluble in organic solvents, soluble in concentrated sulfuric acid with a blue to reddish-brown coloration and dyeing cotton from the vat red to greyish-black shades of excellent fastness properties.

3. As a new product the vat dyestuff of the following formula:

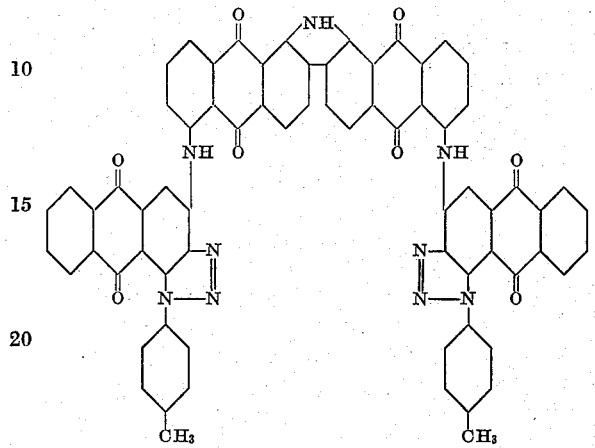

being a dark red crystalline powder, insoluble in organic solvents, soluble in concentrated sulfuric acid with a blue coloration and dyeing cotton from its vat powerful red shades of excellent fastness properties.

In testimony whereof I have hereunto set my hand.

FRITZ BAUMANN. [L. S.]